United States Patent Office 3,054,830
Patented Sept. 18, 1962

3,054,830
DEHALOGENATION OF HALOGENATED AROMATIC COMPOUNDS

John P. Luvisi, Park Ridge, and Louis Schmerling, Riverside, Ill., assignors to Universal Oil Products Company, Des Plaines, Ill., a corporation of Delaware
No Drawing. Filed Oct. 23, 1959, Ser. No. 848,211
11 Claims. (Cl. 260—650)

This invention relates to a novel method for the dehalogenation of halogenated aromatic compounds and more particularly to a method for treating aromatic compounds containing at least one halogen atom on the ring whereby the final product contains at least one halogen atom less than the original halogenated aromatic compound.

The products which are obtained from the process of the present invention will find a wide variety of uses in the chemical field. For example, monochlorobenzene which may be obtained by dehalogenating a dichlorobenzene such as p-dichlorobenzene may be nitrated, the p-nitrochlorobenzene may then be reacted with ammonia to form p-nitroaniline, the latter compound then being reductively alkylated with ketones to form a wide variety of substituted N, N'-dialkyl-p-phenylenediamines, these compounds being useful as antioxidants and antiozonants. In addition to preparing products which are used as intermediates in the preparation of antioxidants and antiozonants of the type hereinbefore set forth, it is also possible to prepare compounds which are useful as intermediates in the preparation of insecticides, those halogenated aromatic compounds containing chlorine being especially effective therefor.

It is therefore an object of this invention to provide a method for preparing aromatic compounds containing substituents which are useful as intermediates in the preparation of other organic chemicals.

A further object of this invention is to provide a method whereby an aromatic compound containing at least one halogen atom on the ring may be at least partially dehalogenated to form aromatic compounds containing at least one halogen atom less than the original compound.

One embodiment of this invention resides in a method for the dehalogenation of an aromatic compound containing at least one halogen atom on the ring which comprises treating said compound with the salt of an organic acid at an elevated temperature to form an aromatic compound containing at least one halogen atom less than the original halogenated aromatic compound.

A further embodiment of this invention is found in a method for the dehalogenation of an aromatic compound containing at least one halogen atom on the ring which comprises treating said compound with the salt of an organic acid at a temperature in the range of from about 50° to about 350° C. to form an aromatic compound containing at least one halogen atom less than the original halogenated aromatic compound.

Yet another embodiment of the invention resides in a method for the dehalogenation of an aromatic compound containing at least one halogen atom on the ring which comprises treating said compound with ammonium acetate at a temperature in the range of from about 50° to about 350° C. to form an aromatic compound containing at least one halogen atom less than the original halogenated aromatic compound.

A specific embodiment of the invention resides in a method for the dechlorination of an aromatic compound which comprises treating p-dichlorobenzene with the salt of an organic acid at a temperature in the range of from about 50° to about 350° C. to form an aromatic compound containing at least one halogen atom less than the original halogenated aromatic compound.

A more specific embodiment of the invention resides in a method for the dechlorination of p-dichlorobenzene which comprises treating said dichlorobenzene with ammonium acetate at a temperature in the range of from about 275° to about 325° C. to form benzene and chlorobenzene.

Other objects and embodiments referring to alternative halogenated aromatic compounds and to alternative salts of organic acids will be found in the following further detailed description of the invention.

As hereinbefore set forth it has now been found possible to dehalogenate an aromatic compound containing at least one halogen atom on the ring by treating said compound with a salt of an organic acid to obtain an aromatic compound containing at least one halogen atom less than the original compound. Aromatic compounds containing halogen substituents on the ring which may be dehalogenated according to the process of this invention include those containing only carbon, hydrogen and halogen atoms (i.e., halogenated aromatic hydrocarbons), the halogen atoms having an atomic weight of between 35 and 127 (i.e. chlorine, bromine and iodine). Suitable compounds include chlorobenzene, bromobenzene, iodobenzene, o-chlorotoluene, o-bromotoluene, o-iodotoluene, m-chlorotoluene, m-bromotoluene, m-iodotoluene, p-chlorotoluene, p-bromotoluene, p-iodotoluene, o-chloroethylbenzene, o-bromoethylbenzene, o-iodoethylbenzene, m-chloroethylbenzene, m-bromoethylbenzene, m-iodoethylbenzene, p-chloroethylbenzene, p-bromoethylbenzene, p-iodoethylbenzene, o-chloropropylbenzene, o-bromopropylbenzene, o-iodopropylbenzene, m-chloropropylbenzene, m-bromopropylbenzene, m-iodopropylbenzene, p-chloropropylbenzene, p-bromopropylbenzene, p-iodopropylbenzene, o-chloroisopropylbenzene, o-bromoisopropylbenzene, o-iodoisopropylbenzene, m-chloroisopropylbenzene, m-bromoisopropylbenzene, m-iodoisopropylbenzene, p-chloroisopropylbenzene, p-bromoisopropylbenzene, p-iodoisopropylbenzene, higher haloalkylbenzenes, 4-chloro-o-xylene, 4-chloro-m-xylene, 3-chloro-o-xylene, 2-chloro-p-xylene, 4-bromo-o-xylene, 4-bromo-m-xylene, 5-bromo-m-xylene, 2-bromo-p-xylene, 4-iodo-o-xylene, 4-iodo-m-xylene, 5-iodo-m-xylene, 2-iodo-p-xylene, o-dichlorobenzene, o-dibromobenzene, o-diiodobenzene, m-dichlorobenzene, m-dibromobenzene, m-diiodobenzene, p-dichlorobenzene, p-dibromobenzene, p-diiodobenzene, 1,2,3-trichlorobenzene, 1,2,3-tribromobenzene, 1,2,3-triiodobenzene, 1,2,4-trichlorobenzene, 1,2,4-tribromobenzene, 1,2,4-triiodobenzene, 1,2,5-trichlorobenzene, 1,2,5-tribromobenzene, 1,2,5-triiodobenzene, 1,3,5-trichlorobenzene, 1,3,5-tribromobenzene, 1,3,5-triiodobenzene, tetra-, penta- and hexahalobenzenes, 1-chloronaphthalene, 1-bromonaphthalene, 1-iodonaphthalene, 2-chloronaphthalene, 2-bromonaphthalene, 2-iodonaphthalene, 1,2-dichloronaphthalene, 1,2-dibromonaphthalene, 1,2-diiodonaphthalene, 1,4-dichloronaphthalene, 1,4-dibromonaphthalene, 1,4-diiodonaphthalene, 1,8-dichloronaphthalene, 1,8-dibromonaphthalene, 1,8-diiodonaphthalene, etc., the halogenated and polyhalogenated tanthracenes, chrysenes, pyrenes, phenanthrenes, naphthacenes, etc. It is to be understood that the aforementioned halogenated aromatic compounds are only representatives of the class of compounds and that the present invention is not necessarily limited thereto.

The dehalogenation of the aforementioned halo-substituted aromatic compounds is effected by treating the compound with a salt of an organic acid, said salts including, in particular the alkali, alkaline earth, and ammonium salts, including ammonium formate, ammonium acetate, ammonium propionate, ammonium butyrate, ammonium valerate, ammonium caproate, ammonium heptanoate, ammonium caprylate, ammonium pelargonate, etc.; sodium formate, sodium acetate, sodium propionate, sodium butyrate, sodium valerate, sodium caproate, sodium heptanoate, sodium caprylate, sodium pelargonate, etc.; potassium formate, potassium acetate, potassium propionate, potassium butyrate, potassium valerate, potassium caproate, potassium heptanoate, potassium caprylate, potassium pelargonate, etc.; lithium formate, lithium acetate, lithium propionate, lithium butyrate, lithium valerate, lithium caproate, lithium heptanoate, lithium caprylate, lithium pelargonate, etc.; magnesium formate, magnesium acetate, magnesium propionate, magnesium butyrate, magnesium valerate, magnesium caproate, magnesium heptanoate, magnesium caprylate, magnesium pelargonate, etc.; calcium formate, calcium acetate, calcium propionate, calcium butyrate, calcium valerate, calcium caproate, calcium heptanoate, calcium caprylate, calcium pelargonate, etc.; and the corresponding rubidium, cesium, strontium and barium salts of saturated organic acids. It is to be understood that the aforementioned salts of organic acids are only representatives of the type of compounds which may be used, and that the present invention is not necessarily limited thereto, it also being contemplated that the salts of unsaturated organic acids such as ammonium acrylate, ammonium crotonate, sodium acrylate, potassium crotonate, etc., and the lithium, rubidium, cesium, barium, magnesium, calcium, etc., salts of acrylic acid, crotonic acid, isocrotonic acid, tiglic and oleic acid, elaidic acid, brassidic acid, behenic acid, propynoic acid, butynoic acid, pentynoic acid, etc., may also be used, although not necessarily with equivalent results.

The dehalogenation is effected at elevated temperatures, the temperatures being in the range of from about 50° to about 350° C. or higher, the preferred temperature being in the range of from about 275° to about 325° C.

The process of the present invention may be effected in any suitable manner and may comprise either a batch or a continuous type operation. For example, when a batch type operation is used a quantity of the starting materials comprising the particular aromatic compound containing at least one halogen substituent on the ring is placed in a suitable apparatus such as a rotating autoclave along with the salt of an organic acid, the salt being present in a mole ratio in the range of from about 1:1 to about 10:1 of monobasic and of from about 0.5:1 to about 5:1 of dibasic salt to halo-substituted aromatic compound. The apparatus is sealed, brought to the desired pressure and heated to the reaction temperature. Upon completion of the desired residence time the apparatus and contents thereof are allowed to cool to room temperature and the dehalogenated product is extracted with an organic solvent such as ether, pentane, benzene, toluene, etc., which is immiscible with the water, separated from the water and recovered by conventional means such as fractional distillation, crystallization, etc.

The reaction may also be effected in a continuous type operation. When this type of operation is used, the halogen substituted aromatic compound is continuously charged to the reaction zone at a liquid hourly space velocity (volume of charge per volume of salt of an organic acid per hour) in the range of from about 0.1 to about 20 or more, the preferred range being from about 0.5 to about 5, said reaction zone being maintained at the proper operating conditions of temperature and pressure. The reaction zone may comprise an unpacked vessel or coil or may be lined with an adsorbent packing material such as fire brick, alumina, dehydrated bauxite or the like. The salt of an organic acid is also continuously charged to the reaction zone through separate lines. If so desired, the salt of the organic acid may be admixed with the halogen substituted aromatic compound before entry into said reactor and the resulting slurry charged thereto in a single stream. Alternatively, the salt of the organic acid may be positioned in the reaction as a fixed bed, or a compact moving bed. Upon completion of the desired residence time the dehalogenated aromatic compound is continuously withdrawn from the reaction zone, separated from the reactor effluent, purified and recovered by conventional means while the residual effluent may be recycled to form a portion of the feed stock.

The following examples are given to illustrate the process of the present invention, which, however, are not intended to limit the generally broad scope of the present invention in strict accordance therewith.

*Example I*

In this example 29 g. (0.2 mole) of p-dichlorobenzene and 62 g. of ammonium acetate (0.8 mole) were placed in the glass liner of a rotating autoclave having a capacity of 850 cc. The liner was sealed into the autoclave and nitrogen pressed in until an initial pressure of 30 atmospheres had been reached. The autoclave was then slowly heated during 2 hours to a temperature of about 300° C. and maintained thereat for a period of 10 hours during which time the maximum pressure in the autoclave reached 108 atmospheres. At the end of this time the autoclave and contents thereof were allowed to cool to room temperature, the final pressure at room temperature being 45 atmospheres. The excess pressure was vented and the product comprising 9.5 g. inside the liner and 40 g. outside the liner were recovered and combined. The organic products were extracted with pentane, the salt was separated and the pentane extract was subjected to fractional distillation, the cuts boiling at 80–81° C. and 131–133° C., comprising benzene and chlorobenzene respectively, were separated and recovered therefrom.

*Example II*

Thirty-six g. of 1,2,4-chlorobenzene and 69 g. of ammonium acetate are weighed into a glass liner of a rotating autoclave similar to that used in Example I above. The liner is sealed into the autoclave and nitrogen pressed in until an initial pressure of 30 atmospheres is reached. As in the preceding example the autoclave is slowly heated during a period of about 2 hours at a temperature of 300° C. and maintained thereat for a period of 10 hours. At the end of this time the autoclave and contents thereof are allowed to cool to room temperature, the excess pressure is vented and the reaction product is recovered. The product is extracted with pentane and the salt is separated from the extract. The pentane extract is then subjected to fractional distillation, the cuts boiling at 80–81° C., 131–133° C., and 172–180° C. comprising benzene, chlorobenzene, respectively, and a mixture of isomeric dichlorobenzenes were separated and recovered. Crystalline p-dichlorobenzene can be recovered from the dichlorobenzene by cooling and filtering (with or without the aid of a solvent such as ethanol).

*Example III*

Forty-seven g. of p-dibromobenzene along with 62 g. of sodium acetate are placed in a rotating autoclave similar to that used in the above examples. The liner is sealed into the autoclave and nitrogen pressed in until an initial pressure of approximately 30 atmospheres is reached. The autoclave is then heated at a temperature between 275° and 325° C. for a period of about 10 hours. At the end of this time the autoclave and contents thereof are allowed to cool to room temperature, the excess pressure is vented and the reaction products both inside the liner and outside the liner are combined. The combined products are then extracted with pentane and the pentane extract is then subjected to fractional distillation, the cuts boiling at 80–81° C. and 155–157° C., comprising benzene and bromobenzene respectively, are separated and recovered therefrom.

Example IV

A mixture of 25 g. (0.2 mole) of p-chlorotoluene and 54 g. (0.6 mole) of ammonium propionate are placed in an autoclave and subjected to the same conditions hereinbefore set forth in the preceding examples, that is, a temperature in the range of from 275° to 325° C., an initial pressure of 30 atmospheres of nitrogen and a residence time of approximately 10 hours. At the end of this time the autoclave and contents thereof are allowed to cool to room temperature, the excess pressure is vented and the reaction product after extraction with pentane are subjected to fractional distillation, the cut boiling at approximately 110° C., comprising toluene, is separated and recovered therefrom.

Example V

A mixture of 39 g. of 1,4-dichloronaphthalene and 50 g. of calcium acetate is treated in a manner similar to that set forth in the above examples. At the end of the desired residence time the autoclave and contents thereof are cooled to room temperature, the excess pressure is vented, and the reaction product after recovery and treatment with pentane is separated from the calcium acetate. The pentane extract is subjected to fractional distillation, the cuts boiling at 218° C. and 259–260° C., comprising naphthalene and 1-chloronaphthalene respectively, being separated and recovered therefrom.

Example VI

A mixture of 37 g. of p-bromoethylbenzene and 40 g. of ammonium formate is treated in a manner similar to that set forth in the above examples. At the end of the desired residence time the reaction products are recovered from inside and outside the liner, combined and extracted with pentane, the pentane extract is separated from the magnesium formate and subjected to fractional distillation under reduced pressure, the cut boiling at 136° C. comprising ethylbenzene being separated and recovered.

We claim as our invention:

1. A method for the dehalogenation of an aromatic compound containing at least one halogen atom on the ring which consists in treating said compound with an organic acid salt selected from the group consisting of the alkali metal, alkaline earth metal and ammonium salts of unsubstituted aliphatic organic acids at a temperature in the range of from about 50° to about 350° C. to form an aromatic compound containing at least one halogen atom less than the original halogenated aromatic compound.

2. A method for the dehalogenation of an aromatic compound containing at least one halogen atom on the ring which consists in treating said compound with ammonium acetate at a temperature in the range of from about 50° to about 350° C. to form an aromatic compound containing at least one halogen atom less than the original halogenated aromatic compound.

3. A method for the dehalogenation of an aromatic compound containing at least one halogen atom on the ring which consists in treating said compound with sodium acetate at a temperature in the range of from about 50° to about 350° C. to form an aromatic compound containing at least one halogen atom less than the original halogenated aromatic compound.

4. A method for the dehalogenation of an aromatic compound containing at least one halogen atom on the ring which consists in treating said compound with ammonium propionate at a temperature in the range of from about 50° to about 350° C. to form an aromatic compound containing at least one halogen atom less than the original halogenated aromatic compound.

5. A method for the dehalogenation of an aromatic compound containing at least one halogen atom on the ring which consists in treating said compound with calcium acetate at a temperature in the range of from about 50° to about 350° C. to form an aromatic compound containing at least one halogen atom less than the original halogenated aromatic compound.

6. A method for the dehalogenation of an aromatic compound containing at least one halogen atom on the ring which consists in treating said compound with ammonium formate at a temperature in the range of from about 50° to about 350° C. to form an aromatic compound containing at least one halogen atom less than the original halogenated aromatic compound.

7. A method for the dechlorination of p-dichlorobenzene which consists in treating said dichlorobenzene with ammonium acetate at a temperature in the range of from about 275° to about 325° C. to form benzene and chlorobenzene.

8. A method for the dechlorination of 1,2,4-trichlorobenzene which consists in treating said trichlorobenzene with ammonium acetate at a temperature in the range of from about 275° to about 325° C. to form benzene, chlorobenzene and dichlorobenzenes.

9. A method for the dechlorination of p-chlorotoluene which consists in treating said chlorotoluene with ammonium propionate at a temperature in the range of from about 275° to about 325° C. to form toluene.

10. A method for the debromination of p-bromoethylbenzene which consists in treating said bromoethylbenzene with ammonium formate at a temperature in the range of from about 275° to about 325° C. to form ethylbenzene.

11. A method for the dechlorination of 1,4-dichloronaphthalene which consists in treating said dichloronaphthalene with calcium acetate at a temperature in the range of from about 275° to about 325° C. to form 1-chloronaphthalene.

References Cited in the file of this patent

UNITED STATES PATENTS

| 2,725,405 | Britton et al. | Nov. 29, 1955 |
| 2,726,271 | Troyan | Dec. 6, 1955 |

OTHER REFERENCES

Wagner et al.: "Synthetic Organic Chemistry," John Wiley & Sons, New York, N.Y., page 8 relied on.